United States Patent [19]

Moore et al.

[11] Patent Number: 5,716,161

[45] Date of Patent: Feb. 10, 1998

[54] RETAINER CLIP

[75] Inventors: Richard B. Moore, Washington; David C. Lubera, Oxford, both of Mich.

[73] Assignee: Ankara Industries, Inc., Clinton Township, Mich.

[21] Appl. No.: 701,748

[22] Filed: Aug. 22, 1996

[51] Int. Cl.$^6$ .................................................. F16B 13/00
[52] U.S. Cl. ...................... 403/406.1; 403/329; 403/397; 52/508; 411/508; 411/396; 411/913; 24/453
[58] Field of Search ........................... 403/384, 385, 403/397, 405.1, 407.1, 406.1, 326, 329; 411/508, 509, 510, 913, 388, 396, 400, 401; 52/508; 24/453, 297, 614, 305

[56] References Cited

U.S. PATENT DOCUMENTS

| | | | |
|---|---|---|---|
| 2,346,769 | 4/1944 | Lichtor | 52/508 |
| 3,557,654 | 1/1971 | Weidner, Jr. | 411/396 |
| 3,651,545 | 3/1972 | Hara | 411/508 X |
| 3,893,208 | 7/1975 | Yuda | 411/508 |
| 3,909,883 | 10/1975 | Fegen | 411/508 X |
| 4,373,826 | 2/1983 | Inamoto et al. | 403/406.1 X |
| 4,524,494 | 6/1985 | Sato et al. | 411/913 X |
| 4,550,230 | 10/1985 | Johnson | 411/401 X |
| 4,644,614 | 2/1987 | Mizusawa | 411/508 X |
| 4,674,910 | 6/1987 | Hayashi | 403/405.1 X |
| 4,927,306 | 5/1990 | Sato | 411/510 X |

*Primary Examiner*—Harry C. Kim
*Attorney, Agent, or Firm*—Barnes, Kisselle, Raisch, Choate, Whittemore & Hulbert

[57] ABSTRACT

A headed fastener clip having a threaded shank with a T-head embedment molded in a hex nut head for rotatably threading the clip into a support. A trim piece attachment post protrudes oppositely from the shank. A pair of spring arms are cantilevered from the post outer free end and diverge dependently therefrom to free ends spaced closely above the nut head. A catch portion adjacent each arm free end dimensioned to overlaps in use mutually opposed marginal edges of a fastener-receiving opening in the trim piece. The nut head has platforms on the head that underlie and support the opening marginal edge when the trim piece is installed on the clip. The fastener clip is first threaded into the support, the trim piece fastener opening registered with clip head and then the trim piece is pushed toward the support. The post free end and spring arms initially freely enter the fastener opening and then its opening edges contact and slide downwardly along the spring arms, thereby yieldably camming them toward the post until the trim piece abuts the clip head. The arms free ends then spring outwardly so that their catch portions overlap the edge openings and thereby releasably secure the trim piece against the fastener head.

24 Claims, 2 Drawing Sheets

RETAINER CLIP

Field of the Invention

This invention relates generally to retainer clips and more particularly to clips for retaining a planar sheet material member to an underlying support by first securing the clip to the support and then pushing the planar member onto the clip.

BACKGROUND OF THE INVENTION

There is a long standing and continuing need for improvement of inexpensive retaining clips for push-on installation, without tools, of various types of sheet material members, such as automotive exterior body moldings, trim pieces etc. Some of the problems arising with prior clips have been difficultly of installation or removal, thereby increasing labor costs and often requiring special tools. Some clips have sacrificed later removability of the attached trim piece or molding in order to gain adequate retention of the piece by the fastener to its support. Others require close tolerances and will not accommodate a liberal manufacturing tolerance range on the fastener openings in the trim pieces and/or manufacturing defects, such as burrs remaining in or around such openings when machined in the trim pieces or flash irregularities or projections in or around such openings when molded or cast in the trim piece. Some retainer clips have required excessive push-on and/or pull-off forces which may result in bending or damage to the trim piece during the attachment procedure and/or during removal of the same.

OBJECTS OF THE INVENTION

Accordingly, objects of the present invention are to provide an improved retainer clip that overcomes the aforementioned problem in a reliable economical and efficient manner, and more particularly an improved clip that can be easily manually installed and quickly removed without requiring any special tools, after removal can be reused, that also can be quickly installed and removed by automatic equipment to the support structure, allows for easy removal of the attached piece from the retainer clip but which securely retains the piece in normal use on the support, requires only a minimum amount of push-on force to attach the piece to the clip, enables a reasonable degree of tolerance variations in the fastener receiving opening dimensions provided in the trim piece without loss of clip retaining force on the attached piece, does not scrape, deface or damage the piece to be attached by the clip to the support, and which is of simplified design, economical manufacture, installation and removal.

SUMMARY OF THE INVENTION

In general, and by way of summary description not by way of limitation, the retainer clip of this invention accomplishes the foregoing objects by providing a headed fastener having a threaded shank that can be varied in form to suit various types of supporting materials, such as hard or soft plastic, metal sheet or plate material or die cast support structures made of aluminum, magnesium, white metal or like materials. Preferably, the shank head is made noncircular and embedment molded in a hex nut head of the fastener for maximum torque resistance in rotatably threading the clip into the support.

An anchoring post protrudes coaxially from the nut head oppositely from the threaded shank and carries a pair of spring legs cantilever attached integrally to the outer free end of the post and divergently dependent therefrom to their free ends which are spaced closely above the outer surface of the nut head. The spring legs each have a catch portion adjacent their free end dimensioned to overlap in use mutually opposed marginal edges of a fastener receiving opening in the trim piece. The nut head has spaced supporting platforms which are arrayed to underlie these marginal edge openings of the trim piece when installed on the clip.

The fastener clip is first screwed into the support member to fully seat its head thereon and thereby securely but removably install the clip with its head protruding from the support member. Then the trim piece is clip-installed on the support member by registering the fastener opening of the trim piece with clip head and pushing the piece toward the support member. The post free end and spring legs initially freely enter the fastener opening and then the opening edges contact and slide downwardly along the spring legs. This push-on motion cams the spring legs toward one another until the trim piece abuts the clip fastener head, whereupon the free ends of the legs spring outwardly apart from one another so that their catch portions overlap the opening edges to thereby releasably secure the trim piece against the fastener head.

Due to their resilience, the spring legs can be squeezed or cam-action forced together to allow removal of the trim piece, when desired, without damage to the clip or trim piece. The clip anchoring post and associated spring legs do not protrude laterally beyond the hexagonal periphery of the head and hence the clip can be quickly socket-wrench installed either manually or by automatic machinery by telescoping the wrench socket over the head post and spring leg structure and onto the clip nut head.

BRIEF DESCRIPTION OF THE DRAWINGS

These and other objects, features and advantages of the present invention will become apparent from the following detailed description, appended claims and accompanying drawings (which are to engineering scale otherwise stated) in which:

DETAILED DESCRIPTION OF PREFERRED EMBODIMENT

Figures 1, 2, 3:
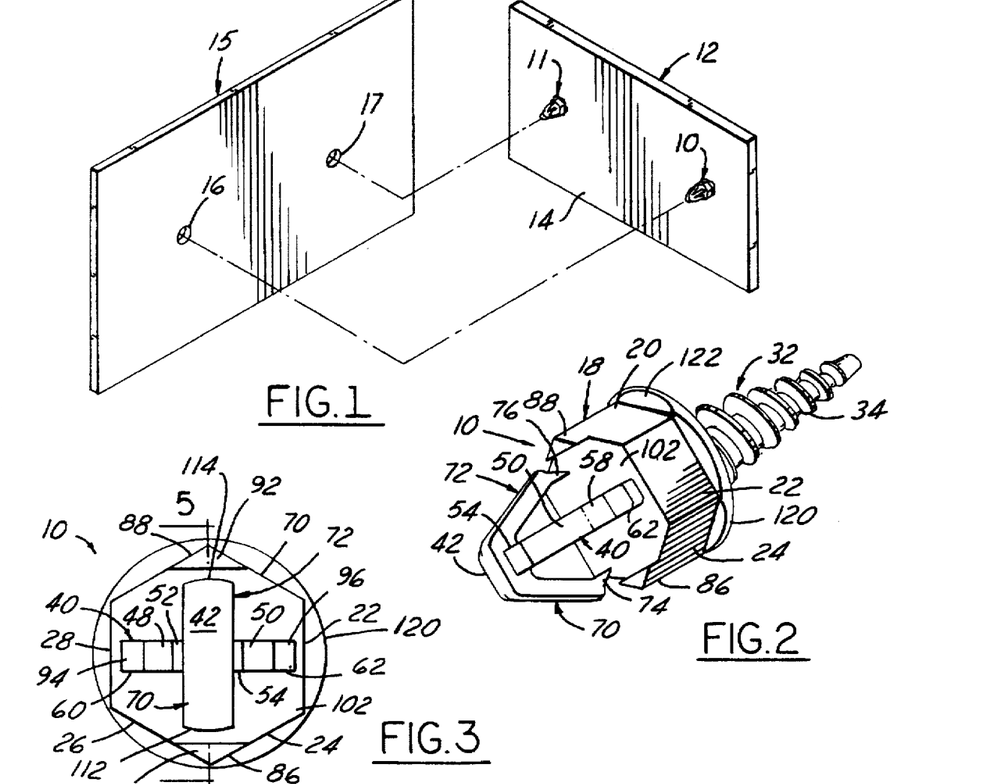
FIG. 1 is an exploded perspective view diagrammatically illustrating two identical retaining clips of the invention installed in a support member, and a trim piece separated therefrom and suitably apertured to be installed by the clips onto the support member.
FIG. 2 is a perspective view of one of the retaining clips of FIG. 1 shown by itself.
FIG. 3 is a top plan view of the clip of FIG. 2.

Referring now more particularly to the drawings, FIG. 1 illustrates a pair of identical retainer clips 10 and 11 of the invention threadably mounted in a suitable supporting member 12 at predetermined locations on an exposed surface 14 of support 12. A planar sheet material member 15 to be attached by clips 10, 11 to support 12 is a suitable apertured to receive the clips, such as by a pair of fastener-receiving through-hole circular openings 16 and 17 located for coaxial registration and alignment respectively with fastener clips 10 and 11 for push-on retention of the piece by the clips to support 12. Typically, support member 12 may be an automotive body panel made of hard or soft plastic or sheet metal, such as a fender, door panel, deck or trunk lid, bumper, etc. The planar member 15 typically is an exterior trim piece or molding made of very thin (e.g. 1.0 mm) sheet material, usually plastic or metal, and/or may be a die cast aluminum or magnesium hollow structure having a thin section mounting wall, and thus often must be handled with care to avoid damage to the piece during its installation and/or removal from its associated support 12.

As best seen in FIG. 2, and in accordance with one feature of the invention retaining clip 10 is basically in the form of a headed fastener with the clip retention structure protruding coaxially from the fastener head oppositely from the fastener shank. More particularly, clip 10 has a head 18 with a multi-faceted polygonal periphery, e.g., with hex nut faces 20, 22, 24, 26, 28 and 30 (FIG. 3) so that the clip can be easily rotated by an open-end wrench or a hex socket wrench engaged with the head nut surfaces.

The clip fastening shank 32 in the exemplarily form shown has self threading-screw threads 34 of the sheet metal fastening type (large pitch, flat root threads on a tapering stem). However, the shank material and/or threads can be readily varied in design to suit different types of hard or soft plastic material, sheet metal, aluminum, magnesium molded or cast materials, depending upon the material and thickness of support 12. Alternatively, shank 32 may be formed as a self threading screw, machine screw stud, or latch pin, depending upon the application.

Figure 5:
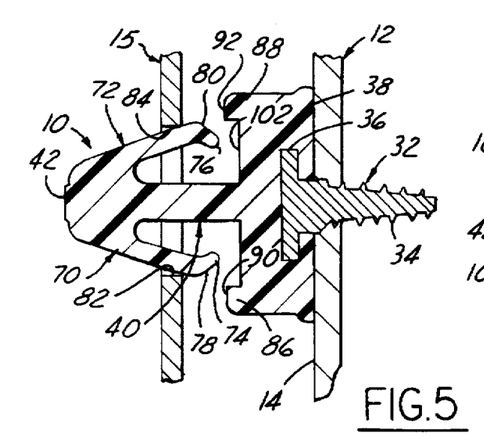
FIG. 5 is a cross-sectional view taken on the line 5—5 of FIG. 3 showing the trim piece as the same is being pushed onto the clip with the clip already mounted to the support member.

Preferably, shank 32 is secured to head 18 by embedment molding of the shank head 36 (FIG. 5) in the material of clip head 18. Preferably, shank head 36 is of non-circular configuration, such as a T-crossbar shape, to provide maximum torque resistance in the connection between shank 32 and head 18. The under surface 38 of head 18 preferably flat and perpendicular to the centerline axis of clip 10 so as to seat flat against the exposed surface 14 of support 12 when fully installed therein as shown in FIG. 5.

In accordance with another feature of the invention the structure of clip 10 for releasably retaining trim piece 15 to support 12 comprises an anchoring post 40 integrally joined at its base end to head 18 and protruding coaxially therefrom to a free end 42. Post 40 is preferably rectangular in cross-section in a plane perpendicular to the clip axis, with flat parallel sides 44, 46 defining a relatively thin thickness dimension of the post (FIG. 6), and having tapering side edges 48, 50 (FIG. 4) defining its width dimension. Side edges 48 and 50 respectively extend from curved shoulders 52 and 54 that merge flush with the free end 42 of post 40. Edges 48 and 50 diverge from one another and terminate in straight parallel portions 56, 58 which lead into a junction with post foot portions 60 and 62 respectively. Foot portions 60 and 62 extend laterally away from one another to respectively form seating platforms 94 and 96 (FIG. 3) and terminate short of the nut hex faces 28 and 22 respectively.

Figure 4:
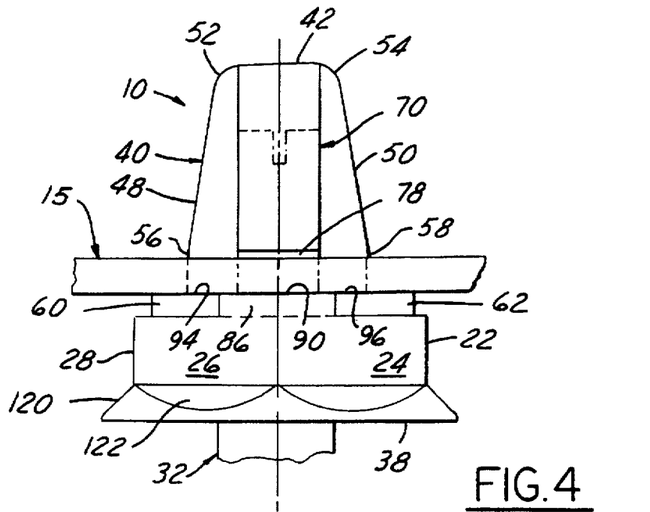
FIG. 4 is a fragmentary side elevational view of the clip with the trim piece fully mounted on the clip.
Figure 6:
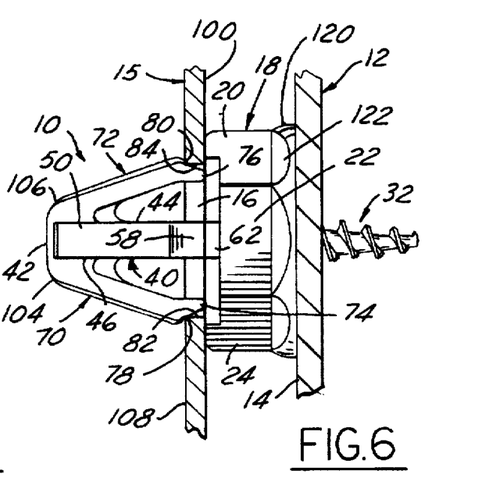
FIG. 6 is a side elevational view, similar to FIG. 5, illustrating the trim piece fully installed on the retaining clip and thereby removably secured to the support member by the clip.

As a further feature, anchoring post 40 carries from its free end 42 a plurality of cantilever spring retaining arms, preferably in the form of a pair of post-flanking spring arms 70 and 72. Arms 70 and 72 are integrally joined at their outer ends to post free end 42 and extend therefrom divergently relative to one another toward head 18 and terminate at arm free ends 74 and 76 which in turn are reversely curved inwardly toward one another, as best seen in FIGS. 5 and 6. The outer edges of arm free ends 74 and 76 are notched slightly inwardly to provide catch surfaces 78 and 80 respectively designed to releasably overlap and catch the mutually opposed marginal edges 82, 84 of the associated trim piece opening 16, as best seen in FIGS. 4 and 6.

Head 18 has a diametrically opposed pair of protuberant bosses 86 and 88 outwardly flanking spring arm free-ends 74 and 76 respectively to provide co-planar seating surfaces 90 and 92 respectively thereon. The two additional seating surfaces 94, 96 on post feet 60 and 62 are coplanar with surfaces 90, 92. Surfaces 90–96 thus cooperate with arm catch surfaces 78 and 80 to provide four equally circumferentially spaced pads for accurately seating thereon the inner mounting surface 100 of piece 15 in the fully mounted condition of FIGS. 4 and 6.

It will be noted that the free-ends 74, 76 of legs 70, 72 terminate generally flush with the plane of seating surfaces 90–96 and are disposed inwardly of pads 86 and 86 in their free state condition shown in FIG. 2. The main outer face 102 of head 18 is recessed from these seating surfaces 90–96 and spaced from the spring arm free-ends 74 and 76.

As best seen in FIG. 3, it will now be understood that all of the protruding structure of clip 18 for retaining trim piece 15 on the clip, namely post 40 and its associated spring arms 70 and 72, are disposed radially inwardly of the hexagonal periphery of nut head 18 so that the hexagonal socket of a socket wrench can be telescoped over this structure and engage the nut hex faces for threading clip 10 into and out of support 12.

In use, one or more retaining clips 18 are installed in predetermined locations on support 12 as desired for locating and mounting trim piece 15 thereon. Clip 18 is readily installed in the manner of a screw fastener suitably designed in accordance with the material and thickness of support 12. In the illustrated embodiment support 12 constitutes a relatively thin sheet metal body panel and hence shank 32 and associated threads 34 are preferably started into a small pilot hole pre-drilled in support 12. Clip 18 may be drawn against panel 12 by grasping head 18, either manually with two fingers, with an open end wrench or with a socket wrench, and the head suitably rotated to thread shank 32 through panel 12 until the underface 38 of head 18 abuts outer face 14 of panel 12, as shown in FIGS. 5 and 6. Due to the aforementioned geometry of clip 18, this clip mounting operation also can be readily handled by automatic robotics equipment, if available.

Once a suitable array of one or more clips 18 have been so installed on support 12, trim piece 15 is positioned outwardly adjacent support 12 so as to overly the installed clips with its fastener receiving opening or openings aligned individually in coaxial registry with the installed clips. As illustrated in the example of FIG. 1, the pair of fasteners-receiving openings 16, 17 in piece 15 are thus respectively coaxially registered with the pair of clips 10 and 11 mounted in support 12. Then all that is required is to push trim piece 15 onto the clips until its inner face 100 abuts the seating surfaces 90–96 of head 18 as shown in FIGS. 4 and 6.

In operation of the clip, and as best seen in comparing FIGS. 5 and 6, during this installation motion of the trim piece in pushing it toward head nuts 18 of clips 10 and 11, the tapered post free-ends 42 first enter the associated trim piece openings 16 and 17 with a large clearance. It will be noted that the rounded shoulders 52, 54 of each post 40 (FIG. 4), as well as the rounded shoulders 104, 106 of each spring arm 70, 72 at their juncture with the free-end of 42 post 40, together provide a four-sided "arrow head" configuration. This greatly facilitates initial registry of the trim piece fastening openings 16, 17 with the pair of clips 10, 10 during this initial push-on of piece 15 toward support 12.

At the intermediate push-on stage shown in FIG. 5, opposed marginal edges 82, 84 of opening 16 initially engage the juxtoposed outer side surfaces of spring legs 70 and 72. Openings 16, 17 are sized relative to the free-state spread of legs 70, 72 such that the opposed fastener opening edges 82, 84 then slide along these arm side surfaces while camming the arms toward one another radially inwardly toward the clip axis. The cantilever arm mounting and resilient nature of the clip material enables the arms to resiliently yield for this flexing action.

As trim piece 15 is abutted against seating head surfaces 90–96 the reentrant surfaces of arm fingers 74, 76 allow the arms to spring radially apart to cause the catch surfaces 78, 80 to slightly overlap the opposed marginal edges of opening 16 at their junction with the outer face 108 of piece 15. Trim piece 15 is thereby securely held against nut 18 in a dimensionally predetermined outwardly spaced relationship from support 12.

To remove trim piece 15 from its installed position on support 12, in those installations where arms 70, 72 remain exposed for access outwardly of the trim piece outer face 108, the removal procedure can be facilitated by manually squeezing the arms 70 and 72 toward one another to thereby disengage the catch surfaces 78, 80 and position them radially inwardly of opening edges 82, 84 as pull off force is exerted on trim piece 15 to withdraw it from the clips.

However, in most installations trim piece 15 will be a hollow trim molding or other type of trim hardware having an outer decorative panel (not shown) spaced outwardly from the outer 11 surface 108 of trim piece 15 in order to hide fastener clips 10 from view. In such installations, removal of such a trim piece is still possible by exerting sufficient pull-off force on it despite inaccessibility of retaining clips 10, 11. This is accomplished by designing catch surfaces 78, 80 with a suitable re-entrant camming angle enabling the engaged outer edges 82 and 84 of fastener opening 16 during initial piece pull-off to cam the arms together until they enter further into the fastener opening, whereupon trim piece 15 becomes free of arm restraining force for further pull-off from support 12.

Pull-off force in such "blind" applications can also be readily adjusted by initial design, alternatively or conjointly, with such re-entrant camming angle by changing the amount or size of the "web" material where arm 70 and/or 72 are integrally joined to the free end portion of post 40. The stiffness and spring rate of cantilever spring arms 70 and/or 72 can be further readily varied for this purpose by initial design of the taper in the cross sectional dimension of the arms in their plane of the flexing motion.

It is to be understood that the included re-entrant camming angle conjointly defined by catch surfaces 78 and 80 is preferably greater than the included camming angle conjointly defined by the outer side surfaces of arms 70, 72 so that the forces required for such "blind" pull-off suitably exceed push-on forces to insure reliable but removable retention of the trim piece on its support. Preferably, for such action, the included camming angle of the outer surfaces of arms 70, 72 in their free state condition ranges between about 50° to 70° and preferably is about 60 degrees, whereas the included camming angle conjointly defined by catch surfaces 78, 80 averages about 80° to 90° and may be even greater at the junction of free ends 76, 78 with the main body of their respective spring arms 70, 72. The length of fingers 74 and 76 parallel to the axis of post 40 preferably extends well above and below the expected installed elevation of surface 108 to accommodate thickness variations in trim piece 15 as well as tilting and bowing of the same relative to the support 12.

From the foregoing it will now be understood that the improved retaining clip of the invention readily accomplishes the aforementioned objects and advantages in a reliable and economical manner. The installation of retaining clips 10 onto support 12 can be accomplished in a rapid, accurate and economical manner, and likewise the installation of trim piece 15 onto the preinstalled retaining clips similarly accomplished in a rapid, accurate and economical manner. Removal of trim piece 15 for repair or replacement is also possible without destroying or damaging either the retaining clips 10, 11 or the trim piece, and without requiring removal of the retaining clips from their support.

When clip 10 is constructed as described and illustrated by way of example in FIGS. 2–6, head 18, anchoring post 40 and arms 70, 72 may be economically injection molded of suitable plastic material, such as Dupont SuperTough 101 or equivalent, with the crossbar T-head 36 of the metal screw part 32 being simultaneously embedment molded in the plastic material of head 18. Alternatively, for certain applications the entire clip may be injection molded in one piece of plastic material, or made of suitable metallic spring material such as high carbon steel on multi-slide tooling or suitable transfer press machines using a progressive die with subsequent heat treatment as needed to provide for suitable flexibility, spring force and memory characteristics. The material and processing selected, of course, must provide suitable resilient flexibility in spring arms 70 and 72 to enable them to function in the manner described previously. The mounting fastener portion of clip 10 may also be made in the form of various fastener types, such as a rigid cylindrical pin shank for certain applications, or in the form of a stud with machine screw threads for other applications.

Due to the spring action of arms 70, 72, the diametrical or lateral spread tolerances of the mutually opposed edges 80, 82 of the fastener receiving opening or openings in trim piece 15 may be relatively large, thereby reducing overall manufacturing costs. Likewise, the thickness tolerances of trim piece 15 can vary slightly while still being accommodated by the catch surfaces 78, 80, although typically such thickness tolerances are more readily controlled in sheet material manufacture than are the diametrical dimensional tolerances of fastener openings 16, 17 of the trim piece. Slight lateral misalignment of the fastener opening array is also accommodated by the spring flex of arms 70, 72 without impairing secure retention of the trim piece on support 12.

It will also now be seen that seating surfaces 90, 92, 94, and/or 96 in cooperation with the pair of opposed spring arms 70 and 72 allows fastener clip 10 to self-adjust to adverse orientation between trim piece 15 and support 12, as when support mounting surface 14 is bowed or not perfectly flat or parallel to trim piece surface 100. In all applications the final positions of spring arms 70 and 72 relative to one another and/or to post 40 as well as to trim piece 15 is determined when head surface 38 bottoms out against surface 14 when fully threaded thereagainst. For example, if trim piece 15 is slightly tilted relative to support 12 at an angle in the plane of the drawing in FIG. 6 when fully installed on clip 10 and operably retained by arms 70 and 72 to support 12, the arms can accommodate such non-parallel relationship between surface 14 and surfaces 100 and/or 108 by arms 70, 72 flexing and by their free ends swinging such that the arms assume an assymetrical orientation relative to post 40. Likewise, if trim piece 15 is slightly tilted relative to support 12 at an angle in the plane of the drawing in FIG. 4, one end of the edge shoulder lip of each of catches 78 and 80 can still retainably engage the associated fastener receiving opening edges 82 and 84 due to the flexibility of the arms and spring forces developed in stressing the arms.

It is also to be understood that seating surfaces 94 and 96, as oriented laterally spaced away from the plane of arms 70, 72, have been found helpful to insure a better, flatter and more accurate seating of trim piece 15 for better gripping by the catch lips of arms 70 and 72 of the marginal edge zone surrounding each hole 16 and 17, particularly when the trim piece itself is at least somewhat flexible and/or bowed. Additionally, the outer surfaces 112 and 114 of legs 70 and 72, as best seen in FIG. 3, are preferably made convex throughout their axial length with a radius of curvature matching that of the circular edge of holes 16, 17. This insures that the catch lip (formed at the junction of finger catch surfaces 78 and 80 respectively with the main body of arms 70 and 72) follows the curvature of the hole edge where it overlaps to thereby maximize the catch-bearing lip surface area of arms 70 and 72 overlying the hole marginal edge.

In some applications trim piece 15 may have other forms of fastener receiving openings, such as oval, square or other non-cylindrical openings, or an elongated slot opening in which the mutual opposed pair of linear edges of the slot extend parallel to the lengthwise dimension of the slot but correspond in their transverse spacing to opening edges 82, 84 as seen in FIGS. 5 and 6. Such a trim piece slot can extend the entire length of a predetermined linear array of retaining clips installed on the body panel, as is typical of automotive body trim molding applications. Indeed such a single slot trim piece may even be more easily installed than a multiple aperture trim piece 15 due to the greater latitude in registry of the molding in the direction of the molding slot length. Of course, in such installations retaining clip embodiments 10, 11 are installed so that the pair of spring arms 70, 72 lie in a plane generally perpendicular to the slot lengthwise dimension, although the free state spread of the spring arms can be varied by design to accommodate some deviation from such perpendicularity.

Moreover, in some applications clip 10 can be made with one of the two spring arms 70 and 72 omitted. In some cases it may be desirable that a solid rib be substituted for the omitted spring arm that has a similarly inclined outer edge surface. In other applications, both of the spring arms may be located on the same side of post 40 and diverge from one another as well as from the post. Even with such variations, as well as the preferred but exemplary embodiment of clip 10 shown in FIGS. 1-6, it will be understood that the circular flange 120 at the base of hex head 18 and its socket-mating facets 122 serve to readily position or locate the hexagonal configuration of head 18 into the socket shape of a conventional nut runner installation tool. When clip 10 is fully so seated in the tool socket, post 40 and spring arms 70, 72 are then held by the engagement of head 18 with the nut runner socket with ample clearance between the interior of the socket and this protruding clip structure, thereby preventing damage to the post and arms during threadably driving clip 10 into support 12 with the nut runner tool. Flange 120 of clip head 18 also serves as an isolation spacer pad between the end edges of the tool socket and mounting surface 14 of support 12 to thereby prevent marring or disturbing of surface 14 as head seating surface 38 is drawn into abutment with support surface 14.

In some applications it will be preferable to make post 40 and its arms 70, 72 integrally as one piece, and head 18 and fastener 32 integrally as another piece, with post 40 having a tee at it base embedment molded into head 18. Alternatively post 40, arms 70, 72 and an integral base piece providing seats 90-96 can be molded as one piece and mounted by molding and/or adhesion on top of a standard, threaded fastener commercially available in various types and sizes. Such modifications enable a wider choice of diverse materials to be utilized in clip 10.

Figure 7:
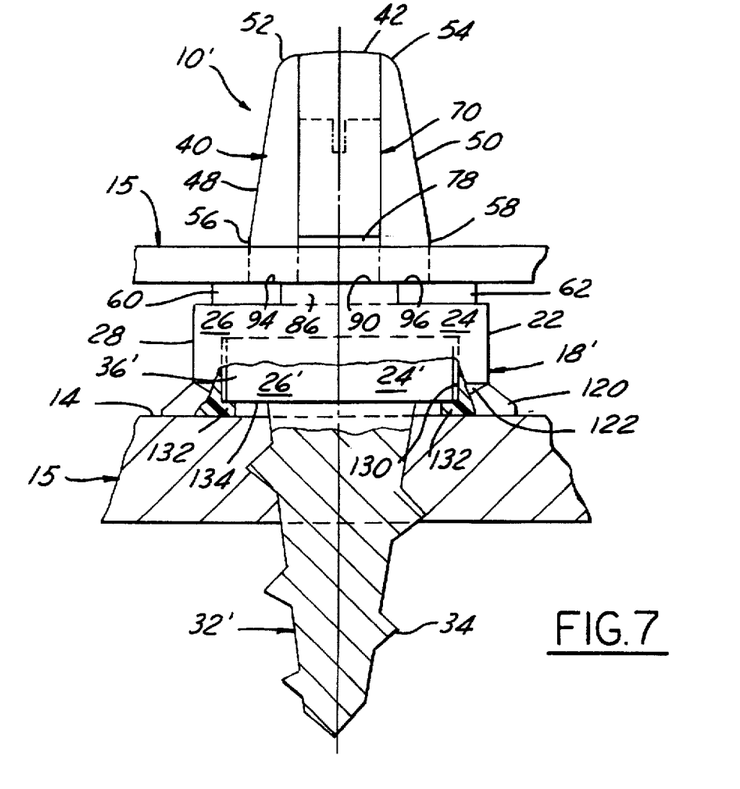
FIG. 7 is a fragmentary side elevational view of a modified embodiment of a clip of the invention, with portions broken away and sectioned to illustrate detail.

Likewise, as shown in the modified embodiment of a clip 10' of the invention (wherein elements previously described are given identical reference numerals and the reference numerals for those elements alike in function are given a prime suffix) clip 10' is made with a plastic clip head 18' that is resiliently yieldably to permit it to be forcably rotatably indexable relative to a head 36' of a standard hex-headed sheet metal screw fastener 32'. For this purpose clip head 18' is molded with a socket cavity 130 open at its bottom end having an interior side wall shape complemental to the exterior side shape of head 18', i.e., hexagonal as shown, or both octagonal if desired.

An internal-flange-type integral flexible lip 132 surrounds the mouth of cavity socket 130 to underlie the underside 134 of fastener head 36' when the latter is installed and seated in socket 130 of clip head 18'.

When fastener head 36' is assembled endwise head first past lip 132 into socket 130, the usual beveled upper corner edge of head 36' will stretch lip 132 sufficiently to permit such entry and then the lip snaps back under the head when head 36' is thereby fully captured in socket 130. Due to the flexibility and slippery surface of the plastic material of the side wall (and lip) of clip hex-head 18', and its slight internal side clearance with fastener hex-head 36', clip head 18' can be forcably rotatably indexed on and relative to fastener hexhead 36' from one to any other of six desired equally angularly spaced orientation (60° increments), even when fastener 32' has been fully threaded into support 15 as shown in FIG. 7 with lip 132 seated between fastener head 36' and support surface 14. Preferably head 18' is so indexed by gripping the sides of post 40 rather than clip head 18'. This feature thus permits the plane of clip arms 70, 72 to be re-oriented, if needed after installing clip 10' on support 15 for better holding engagement orientation with edges 78, 80 of the clip-receiving opening of the aforementioned slotted-opening type trim piece. It will also be seen that during engagement of clip head 18' by a socket of a socket or box wrench, the resultant wrench socket clamping of the exterior facets 24, 26 etc. of the side wall of clip head 18' holds them against the corresponding facets 24', 26' of fastener head 36' and thus resists torque reaction forces to thereby prevent clip head indexing on fastener 32 during threading into and out of support 15.

We claim:

1. For use in securing a planar member having a fastener receiving opening therein defined by spaced apart mutually opposed marginal edges, in overlying, spaced apart relationship to a support, a retainer clip comprising:

(1) a head adapted for abutment against an exposed surface of the support, in the secured condition of said clip onto the support, said head having a transverse dimension greater than the spacing between the mutually opposed edges of the fastener receiving opening of the planar member, (2) a fastening shank having a first end secured to said head and a second free end protruding from said head adapted to enter the exposed surface of the support to secure said clip to the support with said head in abutment against the exposed support surface, (3) an anchoring post secured at one end to said head and protruding therefrom generally coaxially with, and oppositely relative to, said shank and having a free-end spaced from said head, and (4) a plurality of resiliently flexible retention spring arms dependent from said post free-end and extending therefrom divergently relative to one another toward said head, said arms each having a first end cantilever mounted to said post free-end and a second free-end spaced from said head, said arms individually having catch portions defining an array of catches constructed and arranged in the free state of said arms to be spaced apart a predetermined distance so as to retainingly overlap the mutually opposed marginal edges of the planar member fastener receiving opening when registered with its opposed edges in flanking relation with said arms and the planar member is abutted on said head in fully mounted condition thereon, and wherein said arms are constructed and arranged for yieldable swinging movement of said arm free-ends toward one another by camming action of such opening marginal edges as the arms progressively enter the fastener receiving opening when the planar member is brought against the head in mounting of the planar member to the support by the clip until the such opening edge register with said catches, and wherein said fastening shank has a head portion defining said shank first end and secured within said clip head, said clip head, post and arms being made of a first material and said shank being made of a second material different from said first material, said materials being selected from the group consisting of metal and plastic, said clip head and said shank being joined together by embedment molding.

2. The clip set forth in claim 1 wherein said head is in the form of a nut having a polygonal multi-facet periphery and said shank is in the form of a threaded fastener rotatably driven by rotating said clip head.

3. The clip set forth in claim 2 where said shank is initially formed separately from said clip head and said shank head portion has a non-circular configuration in a plane perpendicular to the axis of said clip head and is embedded in said clip head to maximize torque resistance between said clip head and shank for rotatably threading said clip into the support.

4. The clip as set forth in claim 2 wherein said clip head periphery is polgonally multi-faceted.

5. The clip set forth in claim 4 wherein the periphery of said head encircles the maximum outside dimensions of said post and said spring arms in their free state condition to thereby provide clearance for a socket of a head rotating tool telescopically received over said post and arms into engagement with the head periphery for rotating said clip.

6. The clip set forth in claim 1 wherein said post one end is integrally formed with said head and said arm first ends are integrally joined to said post free end.

7. The clip set forth in claim 1 wherein said post, head and shank are coaxial and said post is rectangular in cross-section in a plane perpendicular to the axis of said head and shank, said arms comprising a pair of arms oriented to diverge in a plane perpendicular to the thickness dimension of said post, said post having tapering side edges defining the width dimension of said post and diverging from one another from the free end of said post toward said head.

8. The clip set forth in claim 1 wherein said head has a clip mounting surface adapted to abut the exposed surface of the support and standoff seating surface means spaced axially of said clip from said head mounting surface and adapted to abut a side of the planar member facing the support when said arm catches overlap the opposed marginal edges of the planar member opening in the clip-secured condition thereof on the support.

9. The clip set forth in claim 8 wherein said head stand-off surface means is defined by a spaced array of co-planar platform surfaces formed on rigid spaced apart projections protruding from a major head surface recessed therefrom.

10. The clip set forth in claim 9 wherein said head projections and said arm free ends in their free state are disposed relative to one another such that said arm free ends have flexing movement clearance with said head projections.

11. For use in securing a planar member having a fastener receiving opening therein, as defined by spaced apart mutually opposed marginal edges, in overlying, spaced apart relationship to a support, a retainer clip comprising:

(1) a head adapted for abutment against an exposed surface of the support, in the secured condition of said clip onto the support, in the secured condition of said clip onto the support, said head having a transverse dimension greater than the spacing between the mutually opposed edges of the fastener receiving opening of the planar member, (2) a fastening shank having a first end secured to said head and a second free end protruding from said head and adapted to enter the exposed surface of the support to secure said clip to the support with said head in abutment against the exposed support surface, (3) an anchoring post secured at one end to said head and protruding therefrom generally coaxially with, and oppositely relative to, said shank and having a free-end spaced from said head, and (4) resiliently flexible retention spring arm means dependent from said post free-end and extending therefrom divergently relative to said post toward said head, said arm means having a first end cantilever mounted to said post free-end and a second free-end spaced from said head, said arm means having a re-entrant finger defining said second free-end of said arm means and forming catch portion means constructed and arranged in the free state of said arm means to be spaced a predetermined distance from said post so as to retainingly overlap at least one of the mutually opposed marginal edges of the planar member fastener receiving opening when registered with its opposed edges in flanking relation with said positioned arm means and the planar member is abutted on said head in fully mounted condition thereon, and wherein said arm means are constructed and arranged for yieldable swinging movement of said arm free-end toward said post by camming action of such opening marginal edges as the arm means and post progressively enter the fastener receiving opening when the planar member is brought against said head in mounting of the planar member to the support by said clip until the such opening edge registers with said catch portion means, and wherein said shank comprises a threaded fastener having a head portion secured within said clip head and a threaded shank portion protruding from said fastener head exteriorly of said clip head.

12. The clip set forth in claim 11 wherein said clip head is in the form of a nut having a polygonal multi-facet periphery and a shoulder flange protruding radially outwardly from said multi-facet periphery.

13. The clip set forth in claim 11 where said shank is initially formed separately from said clip head and said shank head portion has a non-circular configuration in a plane perpendicular to the axis of said shank head portion and is embedded in said clip head to maximize torque resistance between said clip head and shank for rotatably threading said clip into and out of the support.

14. The clip as set forth in claim 13 wherein said fastener shank head portion has a periphery that is polygonally multi-faceted and said clip head has a complementary faceted socket capturing said fastener shank portion head therein.

15. The clip set forth in claim 14 wherein said post one end is integrally formed with said clip head from a semi-resilient plastic material and said arm means first end is integrally formed with said post free end from plastic material, and said clip head has a flexible peripheral side wall and an integral re-entrant internal flange lip at the lower end of said side wall also formed of said plastic material, said lip defining a mouth opening to said clip head socket for yieldably receiving said shank head portion coaxially therethrough with an interference pit, said lip underlying an underface of said fastener head portion when said fastener head portion is fully seated in said clip head socket said clip head being rotatably index able relative to said fastener head portion to any one of a plurality of angularly oriented holding positions wherein the clip head socket facets are registered with the fastener head facets.

16. The clip set forth in claim 11 wherein said post, head and shank are coaxial and said post is rectangular in cross-section in a plane perpendicular to the axis of said head and shank, said arm means comprising a pair of arms oriented to diverge oppositely from one another at an included angle of ranging between about 50° to 70° and from each of a pair of opposite sides of said post end in a plane perpendicular to the thickness dimension of said post, said post having tapering side edges defining the width dimension of said post and diverging from one another from the free end of said post toward said head, each of said arms including said finger catch portion thereof having a convex outer surface formed with a radius of curvature adapted to match that of the fastener receiving opening in the planar member, said re-entrant finger catch portions diverging from one another at an included angle ranging between about 70° to 90°.

17. The clip set forth in claim 16 wherein said head has a clip mounting surface adapted to abut the exposed surface of the support and standoff seating surface means spaced axially of said clip from said head mounting surface and adapted to abut a side of the planar member facing the support when said arm catch portions overlap the associated opposed marginal edges of the planar member opening in the clip-secured condition thereof on the support, said head stand-off surface means being defined by a spaced array of four co-planar platform surfaces formed on rigid spaced apart projections protruding from a major head surface recessed therefrom, two of said surfaces being aligned radially of said head with said arms and the other two being aligned in a plane perpendicular to that of said arms.

18. The clip set forth in claim 17 wherein the periphery of said clip head encircles the maximum outside dimensions of said post and said spring arms in their free state condition to thereby provide clearance for a socket of a clip head rotating tool telescopically received over said post and arms into engagement with the head periphery for rotating said clip.

19. For use in securing a planar member having a fastener receiving opening therein defined by spaced apart mutually opposed marginal edges, in overlying, spaced apart relationship to a support, a retainer clip comprising:

(1) a head adapted for abutment against an exposed surface of the support, in the secured condition of said clip onto the support, said head having a transverse dimension greater than the spacing between the mutually opposed edges of the fastener receiving opening of the planar member, (2) a fastening shank having a first end secured to said head and as second free end protruding from said head adapted to enter the exposed surface of the support to secure said clip to the support with said head in abutment against the exposed support surface, (3) an anchoring post secured at one end to said head and protruding therefrom generally coaxially with, and oppositely relative to, said shank and having a free-end spaced from said head, and (4) a plurality of resiliently flexible retention spring arms dependent from said post free-end and extending therefrom divergently relative to one another toward said head, said arms each having a first end cantilever mounted to said post free-end and a second free-end spaced from said head, said arms individually having catch portions defining an array of catches constructed and arranged in the free state of said arms to be spaced apart a predetermined distance so as to retainingly overlap the mutually opposed marginal edges of the planar member fastener receiving opening when registered with its opposed edges in flanking relation with said arms and the planar member is abutted on said head in fully mounted condition thereon, and wherein said arms are constructed and arranged for yieldable swinging movement of said arm free-ends toward one another by camming action of such opening marginal edges as the arms progressively enter the fastener receiving opening when the planar member is brought against the head in mounting of the planar member to the support by the clip until the such opening edges register with said catches, said fastening shank having a head portion defining said shank first end and being secured within said clip head, said clip head being in the form of a nut having a polygonal multi-facet periphery, said shank being in the form of a threaded fastener initially formed separately from said clip head and said shank head portion having a non-circular configuration in a plane perpendicular to the axis of said clip head and being embedded in said clip head to maximize torque resistance between said clip head and shank for rotatably threading said clip into the support.

20. The clip as set forth in claim 19 wherein said clip head periphery is non-circularly faceted, said clip head having a shoulder flange protruding radially outwardly from said clip head faceted periphery.

21. The clip set forth in claim 20 wherein said post one end is integrally formed with said clip head and said arm first ends are integrally joined to said post free end, said clip head, post and arms being integrally molded from plastic material, and said shank being made of metallic material.

22. The clip set forth in claim 21 wherein said post, head and shank are coaxial and said post is rectangular in cross-section in a plane perpendicular to the axis of said head and shank, said arms comprising a pair of arms oriented to diverge in a plane perpendicular to the thickness dimension of said post, said post having tapering side edges defining the width dimension of said post and diverging from one another from the free end of said post toward said head.

23. For use in securing a planar member having a fastener receiving opening therein defined by spaced apart mutually opposed marginal edges, in overlying, spaced apart relationship to a support, a retainer clip comprising:

(1) a head adapted for abutment against an exposed surface of the support, in the secured condition of said clip onto the support, said head having a transverse dimension greater than the spacing between the mutually opposed edges of the fastener receiving opening of the planar member, (2) a fastening shank having a first end secured to said head and a second free end protruding from said head and adapted to enter the exposed surface of the support to secure said clip to the support with said head in abutment against the exposed support surface, (3) an anchoring post secured at one end to said head and protruding therefrom generally coaxially with, and oppositely relative to, said shank and having a free-end spaced from said head, and (4) a plurality of resiliently flexible retention spring arms dependent from said post free-end and extending therefrom divergently relative to one another toward said head, said arms each having a first end cantilever mounted to said post free-end and a second free-end spaced from said head, said arms individually having catch portions defining an array of catches constructed and arranged in the free state of said arms to be spaced apart a predetermined distance so as to retainingly overlap the mutually opposed marginal edges of the planar member fastener receiving opening when registered with its opposed edges in flanking relation with said arms and the planar member is abutted on said head in fully mounted condition thereon, and wherein said arms are constructed and arranged for yieldable swinging movement of said arm free-ends toward one another by camming action of such opening marginal edges as said arms progressively enter the fastener receiving opening when the planar member is brought against said clip head in mounting of the planar member to the support by said clip until the such opening edges register with said catches, and wherein said clip head has a clip mounting surface adapted to abut the exposed surface of the support and standoff seating surface means spaced axially of said clip from said head mounting surface and adapted to abut a side of the planar member facing the support when said arm catches overlap the opposed marginal edges of the planar member opening in the clip-secured condition thereof on the support, said head stand-off surface means being defined by a spaced array of co-planar platform surfaces formed on rigid spaced apart projections protruding from a major head surface recessed therefrom.

24. The clip set forth in claim 23 wherein said head projections and said arm free ends in their free state are disposed relative to one another such that said arm free ends having flexing movement clearance with said head projections.

* * * * *

UNITED STATES PATENT AND TRADEMARK OFFICE
CERTIFICATE OF CORRECTION

PATENT NO. : 5,716,161
DATED : February 10, 1998
INVENTOR(S) : Richard B. Moore/David C. Lubera It is certified that error appears in the above-indentified patent and that said Letters Patent is hereby corrected as shown below:

Col 9, Line 32, change "edge" to "edges".

Col 10, Lines 27-28, delete "in the secured condition of said clip onto the supports,".

Col 11, Line 15, change "portion head" to "head portion".

Col 11, Line 26, change "pit" to "fit".

Col 11, Line 29, change "index able" to "indexable".

Col 14, Line 27, change "having" to "have".

Signed and Sealed this

Twenty-eighth Day of July, 1998

Attest:

BRUCE LEHMAN

Attesting Officer

Commissioner of Patents and Trademarks